United States Patent [19]

Marzola et al.

[11] Patent Number: 5,565,051
[45] Date of Patent: Oct. 15, 1996

[54] PROCESS FOR REPAIRING PLASTIC COATINGS ON METAL PIPES

[75] Inventors: Roberto Marzola; Gian L. Rigosi, both of Ferrara, Italy

[73] Assignee: Montell North America Inc., Wilmington, Del.

[21] Appl. No.: 427,642

[22] Filed: Apr. 24, 1995

Related U.S. Application Data

[63] Continuation of Ser. No. 90,832, Jul. 12, 1993, abandoned.

[30] Foreign Application Priority Data

Jul. 17, 1992 [IT] Italy ................... MI92A1746

[51] Int. Cl.⁶ ................. B32B 35/00; F16L 55/16
[52] U.S. Cl. .................. 156/94; 29/402.11; 138/99; 156/98
[58] Field of Search ................... 156/94, 95, 98; 138/97, 99, DIG. 9; 29/402.11, 402.21; 285/15

[56] References Cited

U.S. PATENT DOCUMENTS

| | | | |
|---|---|---|---|
| 2,717,848 | 9/1955 | Jaye | 138/DIG. 9 |
| 2,786,264 | 3/1957 | Colombo | 156/94 |
| 2,857,931 | 10/1958 | Lawton | 138/DIG. 9 |
| 2,962,402 | 11/1960 | Sweeney | 138/DIG. 9 |
| 3,307,590 | 3/1967 | Carlson | 138/DIG. 9 |
| 3,528,458 | 9/1970 | Gaeckel | 138/DIG. 9 |
| 4,146,562 | 3/1979 | Fukushima | 138/DIG. 9 |
| 4,198,327 | 4/1980 | Matsumoto et al. | 525/73 |
| 4,350,797 | 9/1982 | Marzola et al. | 156/244.11 |
| 4,424,246 | 1/1984 | Pieslak | 138/99 |
| 4,455,204 | 6/1984 | Pieslak | 138/145 |
| 4,465,309 | 8/1984 | Nimke | 138/99 |
| 4,732,412 | 3/1988 | van der Linden | 138/99 |
| 4,857,371 | 8/1989 | McClintock | 428/36.5 |

FOREIGN PATENT DOCUMENTS

| | | |
|---|---|---|
| 0049609 | 10/1981 | European Pat. Off. . |
| 0134491 | 7/1984 | European Pat. Off. . |
| 0163508 | 5/1985 | European Pat. Off. . |
| 0444446 | 9/1991 | European Pat. Off. . |
| 63-199885 | 2/1987 | Japan . |
| 2131741 | 6/1984 | United Kingdom ................ 156/94 |

*Primary Examiner*—Daniel Stemmer

[57] ABSTRACT

Parts of coatings made of plastic material on metal pipes, that have either been removed or damaged, are repaired by using one or more segments of a hollow cylinder having an inside radius equal to the outside radius of the metal pipe and an outside radius equal to the sum of the outside radius of the metal pipe plus a length from 80% to 120% of the thickness of the coating, said hollow cylinder segments being made up of a polymer composition, preferably foamed, comprising (percentages by weight):

A) from 92% to 100% of a thermoplastic polymer selected from polypropylene; crystalline copolymers of propylene containing from 2% to 25% in moles of ethylene and/or $C_4$–$C_{10}$ α-olefins; heterophasic compositions comprising said polypropylene or crystalline copolymers of propylene in combination with one or more elastomeric olefin copolymers;

B) from 0% to 8% of a filler having the function of blocking UV radiation.

4 Claims, No Drawings

PROCESS FOR REPAIRING PLASTIC COATINGS ON METAL PIPES

This application is a continuation of application Ser. No. 08/090,832, filed Jul. 12, 1993 now abandoned.

The present invention relates to a process for repairing plastic coatings on metal pipes.

Metal pipes, generally made of steel, covered with plastic materials are widely used for pipelines carrying, even for long distances, fluids such as oil, natural gas or water.

Said pipelines must be able to withstand the most varied environmental conditions and, in some cases, the high temperatures that are maintained in the proximity of pumping stations, for example, or that can also be typical of certain fluids extracted from the subsoil. In order to obtain an optimum thermal insulation one may use, for the coating, foamed plastics, or thick nonfoamed plastics.

In order to avoid weak points along the line and maintain a high thermal insulation, it is necessary, therefore, that damaged or removed segments of the plastic coating (where the pipes are welded together, for example) be repaired in such a way that the mechanical properties are as similar as possible to the ones of the original coating.

Published European Patent Application 444446 a counterpart of which is the U.S. Pat. No. 5,256,226, of Marzola et al., teaches that the parts of plastic coatings that are removed or damaged on metal pipes (particularly nonfoamed coatings), can be successfully repaired by using pieces or strips of polypropylene materials that are bonded to the pipes by way of specific adhesive polymer compositions. However, the above process is not well suited for repairing pipes covered with foamed or thick nonfoamed plastics, i.e., pipes where the thickness of the casing is from 5 mm to 10 cm, for example.

There have now been perfected coating materials and repairing methods that allow one to obtain, in the repaired parts of pipes that are coated with either foamed plastics or nonfoamed plastics (the latter generally having high thickness), high physical-mechanical and thermal insulation characteristics, comparable to those of the original coatings, and particularly adequate for repairing coatings made of foamed or thick polypropylene materials. In particular, a process has been perfected for repairing the external coating of metal pipes, said coating being made of plastic material, said process comprising applying a repair coating to the parts of the coating in which the plastic material has been removed or damaged, wherein said repair coating consists essentially of one or more segments of a hollow cylinder having an inside radius equal to the outside radius of the metal pipe and an outside radius equal to the sum of the outside radius of the metal pipe plus a length comprised between 80% and 120% of the thickness of the coating, said hollow cylinder segments being made up of a polymer composition, preferably foamed, comprising (percentages by weight):

A) from 92% to 100% of a thermoplastic polymer selected from polypropylene; crystalline copolymers of propylene containing from 2% to 25% in moles of ethylene and/or $C_4$–$C_{10}$ α-olefins; heterophasic compositions comprising a polymer of the above mentioned types in combination with one or more elastomeric olefin copolymers;

B) from 0% to 8% of a filler having the function of blocking UV radiation, such as titanium dioxide and carbon black. Examples of polymers that can be used for component (A) are:

isotactic polypropylene having an isotactic index up to 99;

random propylene/ethylene copolymers with an ethylene content from 1% to 6% by weight, more preferably from 2% to 4%;

random propylene/ethylene/1-butene copolymers with an ethylene content from 2% to 3%, and a 1-butene content from 4.5% to 5.6% by weight;

blends of the above mentioned copolymers with EPR (ethylene-propylene rubber) or EPDM (ethylene-propylenediene monomer) olefin elastomers, optionally vulcanized, preferably containing from 5% to 40% by weight of elastomers;

heterophasic compositions obtained by way of stereospecific sequential polymerization of propylene with ethylene and/or $C_4$–$C_{10}$ α-olefins, optionally in the presence of minor quantities of a diene such as butadiene, 1,4-hexadiene, 1,5-hexadiene, and 1-ethylidene-norbornene.

Examples of $C_4$–$C_{10}$ α-olefins that can be present in the above mentioned polymers are: 1-butene, 4-methyl-1-pentene and 1-hexene.

In the above mentioned heterophasic compositions, the ethylene and/or $C_4$–$C_{10}$ α-olefins can be present in quantities up to 50% by weight.

As previously stated, the polymer composition used for the hollow cylinder is preferably foamed. For this purpose one can use foaming agents for olefin materials already known in the art, in particular agents that are capable of expanding the polyolefins during the extrusion or injection-molding phase.

In fact, as will be described in more detail below, the hollow cylinder segments used in the process of the present invention can conveniently be prepared by way of extrusion or injection molding.

Generally speaking, the above foaming agents are made up of low-boiling gases or liquids, or materials that release gas by heating. Specific examples of foaming agents are air, nitrogen, carbon dioxide or hydrocarbons, optionally fluorinated and/or chlorinated, such as butane, propane, isobutane, pentane, hexane, dichlorodifluoromethanes, dichlorotrifluoroethane, or compositions based on citric acid and sodium bicarbonate, or azodicarbonamide. Together with the above foaming agents one can optionally use nucleating agents, such as talc or sodium benzoate.

For the purpose of the present invention it is preferable if the expansion of component (A) is such that its density ranges from 650 to 800 kg/m$^3$. The method for the preparation of the hollow cylinder is not particularly critical. As previously stated, one can operate by extruding the polymer composition on a pipe having the outside diameter equal to the outside diameter of the pipe whose coating is to be repaired (so that the inside diameter of the extrudate is equal to the outside diameter of the pipe) until the desired thickness is obtained.

The hollow cylinder segments are obtained by cutting and removing from the pipe the coating material thus obtained. As an alternative, one can operate, for example, by injection-molding using the proper molds. The hollow cylinder segments are cut or formed in such a way that their shape fits perfectly the area to be coated. In order to obtain a good coating, it may be appropriate to use one or more hollow cylinder segments with the proper shape. Obviously, the placing of the hollow cylinder segments on the parts of the pipe that need to be repaired is done in such a way that the inside surface of said hollow cylinder segments is in contact with the outside surface of the pipe.

In order to bond the hollow cylinder segments to the metal pipe, it is convenient to put a layer of adhesive material between the metal pipe and said hollow cylinder segments.

Hot melt adhesives are very suitable for this purpose, particularly the ones described in the above mentioned published European patent application 444446, which comprise, by weight:

i) from 59% to 94% of polypropylene, or a random propylene/ethylene or propylene/ethylene/1-butene copolymer, or their blends with one or more plastomeric polymers selected from ethylene/vinyl acetate copolymers, low density polyethylene (LDPE), high density polyethylene (HDPE), polyamides and polyurethane;

ii) from 5% to 40% of a polymer, or a blend of elastomeric polymers, selected from EPR; EPDM olefin elastomers; SEBS (styrene-ethylene-butadiene-styrene) and SBS) (styrene-butadiene-styrene) block copolymers; and ethylene/ethyl acrylate copolymers;

iii) from 1% to 10% of polypropylene modified with maleic anhydride, or isophoronebismaleamic acid, or acrylic acid in quantities from 1% to 10%.

Other types of hot melt adhesives can be obtained by mixing the above components (i) and (iii) with the heterophasic compositions described above for component (A).

Said adhesives can be applied on the pipe separately, with respect to the hollow cylinder segments, in the form of film or powder, for example. It is also possible to apply said adhesives to the inside of the hollow cylinder segment by extrusion.

In this manner one obtains a hollow cylinder segment whose inside surface is coated with a layer of the above adhesive, preferably having a thickness from 10 to 2000 μm.

The bonding of the hollow cylinder segments onto the uncoated area of the pipe is accomplished, for example, by heating the pipe to the proper temperatures, preferably from 200° and 240° C. For this purpose one can use an induction furnace, for example. It is particularly effective if before the application of the adhesive and the hollow cylinder segments, and before heating the pipe, the uncoated surface of said pipe is cleaned, for example, by way of sand blasting, and one or more primers are applied to the pipe surface (such as epoxy resins, silanes and chromates, for example).

During the application phase, the hollow cylinder segment or segments can be held and forced into their position by way of straps or sheaths made of thermoshrinkable materials.

Any gaps left in the coating after the repairs have been completed can be filled by extruding in said gaps a polymer composition of the same type as the one used for the hollow cylinder segments.

The following examples are given to illustrate, and not limit, the present invention.

EXAMPLE 1

A steel pipe, previously sand-blasted but not heated, is coated by lateral extrusion, using a sheet of adhesive polymer composition and various layers of a sheet of foamed polymer composition, thus obtaining a coating with the total thickness equal to 4 cm. The thickness of the adhesive material is 500 μm.

The adhesive polymer composition comprises (percentages by weight) 86.5% of propylene/ethylene random copolymer containing 4% of ethylene, 10% of Dutral CO 054 (EPR copolymer containing 44% by weight of propylene), and 3.5% of Hercoprime G (polypropylene grafted with 1.5 wt. % maleic anhydride); the foamed polymer composition comprises 98% of propylene/ethylene heterophasic copolymer, and 2% of titanium dioxide.

The above mentioned propylene/ethylene heterophasic copolymer has been obtained by sequential copolymerization in the presence of a Ziegler-Natta catalyst, has melt flowrate (ASTM D 1238, Condition L) of 3 g/10 min, contains 85% of isotactic polypropylene and 15% of ethylene/propylene copolymer, and has a total content of ethylene equal to 7%.

In order to obtain the above polymer composition in foam form, one adds, in the extruder producing the coating, about 1.2% by weight of Hydrocerol HK expanding agent (based on citric and sodium bicarbonate, marketed by Boehringer Ingelheim), and about 0.3% of sodium benzoate. Thus one obtains a density of about 700 Kg/m$^3$. From this coating one obtains a hollow cylinder divided lengthwise into two segments, and with a length equal to the length of the welded-joint area to be repaired; the foamed coating of the pipes to be repaired is made of polypropylene material, and has a total thickness of 4 cm.

The area of the pipe to be repaired is sand-blasted, a thin layer (20–40 μm) of a single-component liquid epoxy resin (such as OLE PRIMER, from Veneziani) is applied, and then the two segments of the hollow cylinder are secured to the pipe by using some straps. The steel is heated to 220° C. using an induction furnace; the straps are tightened further in order to bring the thickness of the pipe original coating and that of the area being repaired at the same level. The edges of the repair are sealed by using a small portable extruder Omocron EP 715 containing a polymer composition comprising 98% of the above mentioned propylene/ethylene heterophasic copolymer and 2% of titanium dioxide.

EXAMPLE 2

One operates as in Example 1, the difference being that the hollow cylinder is made up only of foamed material. The repair of the welded-joint area is carried out as indicated in Example 1, with the difference that after the epoxy resin, one applies powder adhesive using an electrostatic gun.

Insulation tests in a NaCl 0.1M aqueous solution showed a perfect seal was achieved for the repair. The insulation resistance for both Examples was >$10^{12}$ Ω m$^2$ (norm NF A 49-710). Adhesion tests at ambient temperature showed, for both Examples, values higher than 10 N/mm$^2$ (norm BS 903 A21).

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for repairing the casing of a metal pipe having a casing made of polypropylene material that is a foam or is at least 5 mm thick, and which casing has a damaged or removed segment, said process comprising (1) replacing said damaged or removed segment with (i) one or more preformed, repair segments of a hollow cylinder having an inside radius equal to the outside radius of the metal pipe and an outside radius equal to the sum of the outside radius of the metal pipe plus between 80% and 120% of the thickness of the casing, said repair segment, when one is used, and said repair segments together, when more than one are used, corresponding in shape and length to said damaged or removed segment, and being made up of a polymer composition comprising:

A) from 92 to 100% by weight of a thermoplastic polymer selected from the group consisting of: isotactic polypropylene; crystalline copolymers of propylene containing from 2 to 25 mole % of ethylene, a $C_4$–$C_{10}$ α-olefin, or ethylene and a $C_4$–$C_{10}$ α-olefin; and heterophasic compositions comprising (a) isotactic polypropylene or one of said crystalline copolymers of propylene, and (b) one or more elastomeric olefin copolymers; and B) from 0 to 8% by weight of a filler that blocks UV radiation; and (ii) a layer of hot melt adhesive between tile repair segment, or repair segments, and the pipe; (2) heating the pipe to a temperature sufficient to melt said adhesive and thereby bond the repair segment or repair segments to the pipe; and (3) sealing the edges of the repair segment or repair segments by extruding a polymer having the same composition as said polymer composition.

2. The process of claim 1, wherein said polypropylene material is a foam, and said polymer composition is a foam with density in the range from 650 to 800 Kg/m³.

3. The process of claim 1, wherein said adhesive comprises:

i) from 59 to 94% by weight of a member of the group consisting of polypropylene, a random propylene/ethylene copolymer, a random propylene/ethylene/1-butene copolymer, and blends of each of the foregoing members of the group with one or more thermoplastic polymers selected from the group consisting of ethylene/vinyl acetate copolymers, low density polyethylene, high density polyethylene, polyamides and polyurethane;

ii) from 5 to 40% by weight of at least one elastomeric polymer selected from the group consisting of ethylene-propylene rubber, ethylene-propylene-diene rubber, styrene-ethylene-butadiene-styrene and styrene-butadiene-styrene block copolymers, and ethylene/vinyl acrylate copolymers; and iii) from 1 to 10% by weight of polypropylene modified with 1 to 10% by weight of the polypropylene of maleic anhydride, or isophorone bismaleamic acid, or acrylic acid.

4. The process of claim 3, wherein prior to replacing said damaged or removed segment with the repair segment, the damaged segment, if any, is removed; the exposed surface of the pipe is cleaned; a primer is applied thereto; with the adhesive applied to the primer or to the repair segment, the repair segment is put into place on the pipe; and the corresponding portion of the pipe is heated to 200°–240° C.

* * * * *

UNITED STATES PATENT AND TRADEMARK OFFICE
CERTIFICATE OF CORRECTION

PATENT NO. : 5,565,051
DATED : October 15, 1996
INVENTOR(S) : Roberto Marzola et al It is certified that error appears in the above-indentified patent and that said Letters Patent is hereby corrected as shown below:

At col. 5, line 12, change "tile" to --the--.

At col. 6, lines 12 and 13, change "ethylene/vinyl" to --ethylene/ethyl--.

Signed and Sealed this

Third Day of February, 1998

BRUCE LEHMAN

Attest:

Attesting Officer

Commissioner of Patents and Trademarks